(12) United States Patent
Schiltz

(10) Patent No.: US 7,270,232 B2
(45) Date of Patent: *Sep. 18, 2007

(54) CONVEYOR BELT DRIVE ROLLER

(75) Inventor: Brian Scott Schiltz, Algona, IA (US)

(73) Assignee: Kossuth Fabricators, Inc., Algona, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/376,281

(22) Filed: Mar. 15, 2006

(65) Prior Publication Data
US 2006/0219529 A1    Oct. 5, 2006

Related U.S. Application Data

(63) Continuation-in-part of application No. 11/096,793, filed on Apr. 1, 2005, now Pat. No. 7,021,457.

(51) Int. Cl.
B65G 23/06    (2006.01)
(52) U.S. Cl. ...................................... 198/835
(58) Field of Classification Search ............... 198/834, 198/835
See application file for complete search history.

(56) References Cited

U.S. PATENT DOCUMENTS

| 3,015,381 | A | | 1/1962 | Mohwinkel et al. |
|---|---|---|---|---|
| 3,853,016 | A | | 12/1974 | Lane et al. |
| 3,942,338 | A | * | 3/1976 | Furlette et al. ............... 464/34 |
| 3,980,174 | A | | 9/1976 | Conrad |
| 4,072,062 | A | | 2/1978 | Morling et al. |
| 4,169,530 | A | * | 10/1979 | Fryatt ......................... 198/835 |
| 4,449,958 | A | | 5/1984 | Conrad |
| 4,603,718 | A | * | 8/1986 | Hutson ..................... 144/208.8 |
| 5,234,097 | A | | 8/1993 | Okuyama |
| 5,320,214 | A | | 6/1994 | Kordis |
| 5,330,341 | A | | 7/1994 | Kemerer et al. |
| 5,458,477 | A | | 10/1995 | Kemerer et al. |
| 5,911,307 | A | | 6/1999 | Kraft et al. |
| 5,927,479 | A | * | 7/1999 | Merten et al. .............. 198/834 |
| 6,564,932 | B2 | | 5/2003 | Itoh |
| 6,938,754 | B2 | * | 9/2005 | Kanaris ....................... 198/494 |
| 2002/0046929 | A1 | | 4/2002 | Finnegan et al. |
| 2002/0134651 | A1 | | 9/2002 | Itoh |
| 2004/0089519 | A1 | | 5/2004 | Pollak et al. |

* cited by examiner

Primary Examiner—Mark A. Deuble
(74) Attorney, Agent, or Firm—McKee, Voorhees & Sease, P.L.C.

(57) ABSTRACT

The current invention is a conveyor belt system and a conveyor belt drive roller and method of making in which the drive roller comprises a cylindrical body having a circumference and opposite ends, a plurality of lug grooves in the cylinder located around the circumference of the cylinder and a belt slot in the cylinder located around the circumference of the cylinder. It is preferred that the belt slot is located adjacent the lug grooves and deeper than the lug grooves. It is also preferred that the lug grooves are formed with inverted tapers which deepen towards the belt slot.

18 Claims, 6 Drawing Sheets

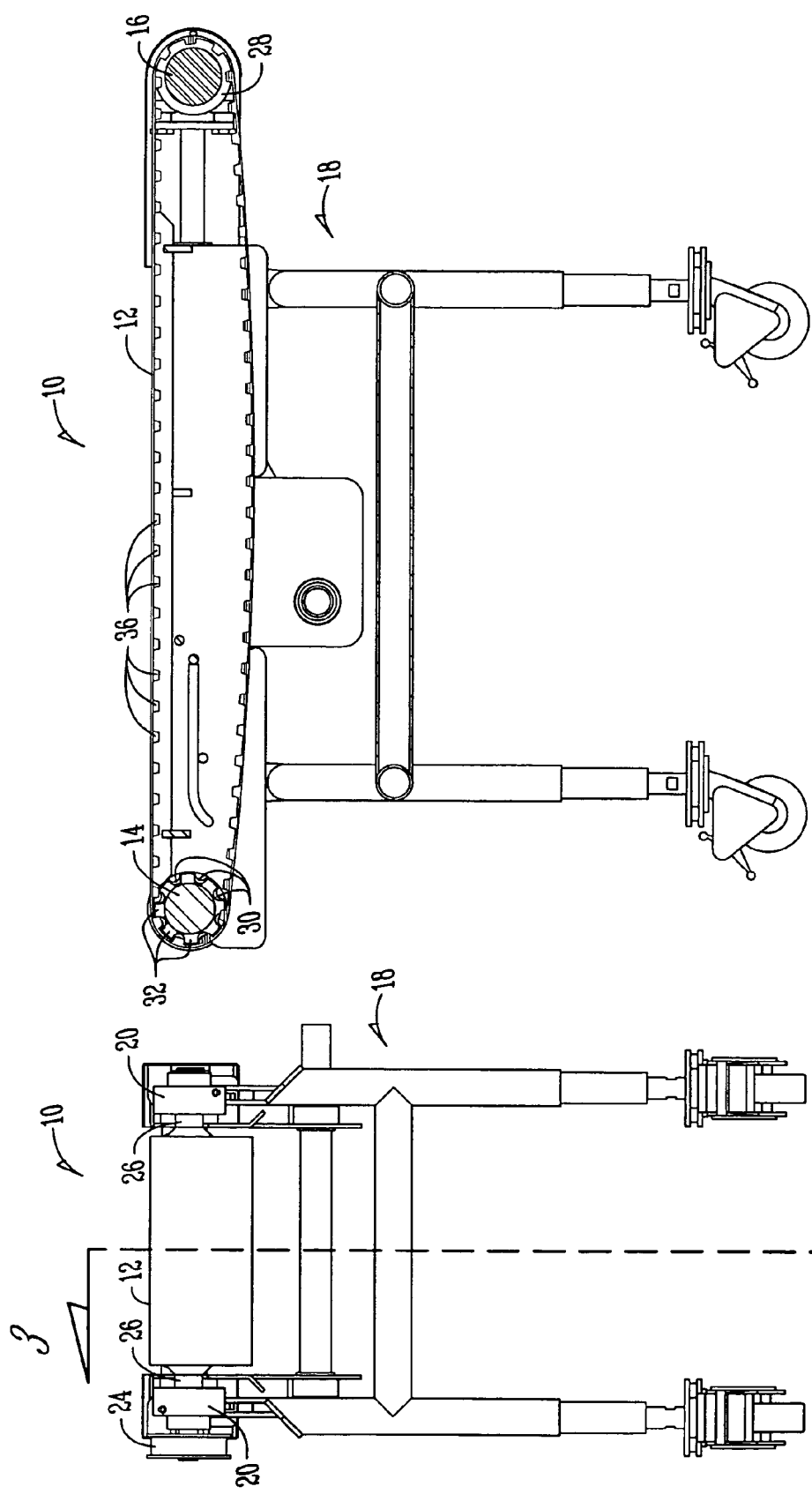

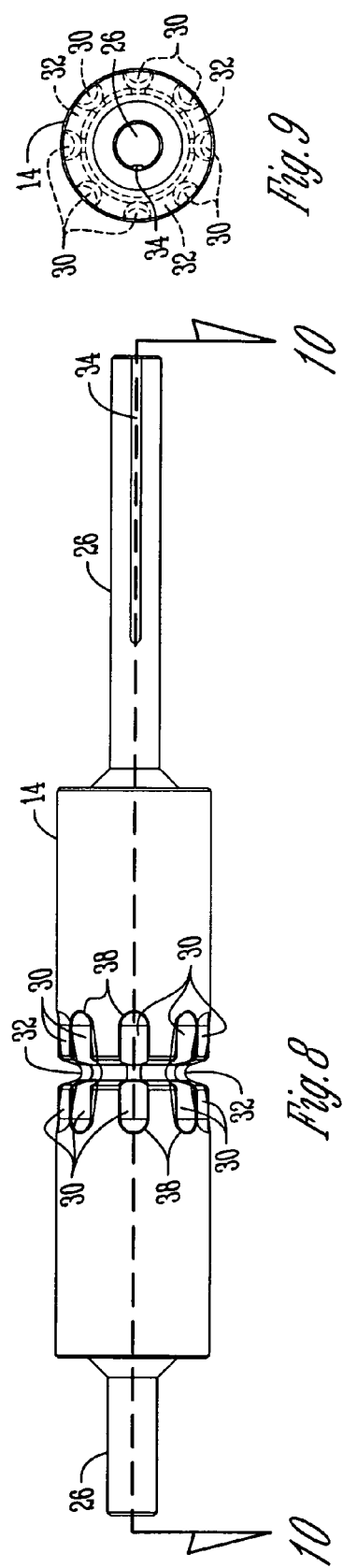
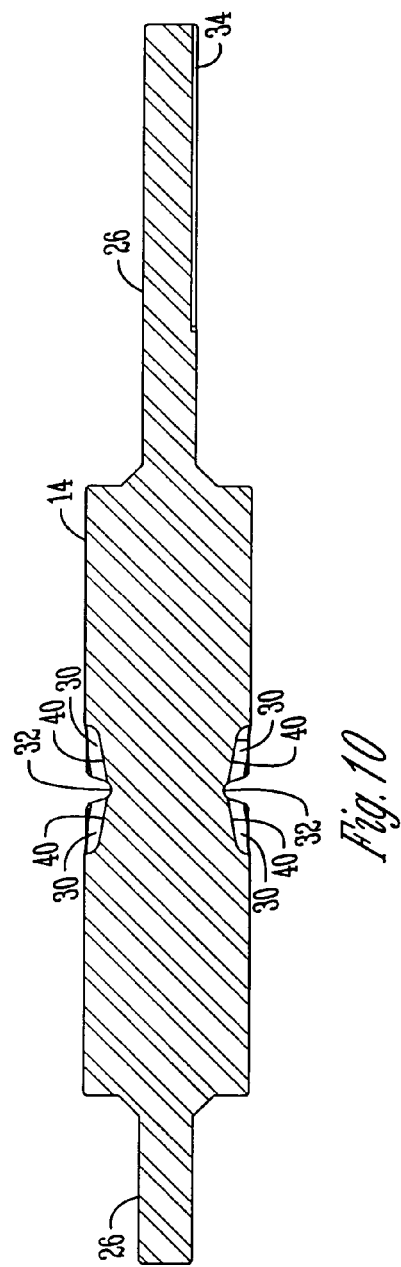

CONVEYOR BELT DRIVE ROLLER

CROSS-REFERENCE TO RELATED APPLICATIONS

This application is a Continuation-in-Part application of U.S. application Ser. No. 11/096,793 filed Apr. 1, 2005, now U.S. Pat. No. 7,021,457 which application is hereby incorporated by reference in its entirety.

BACKGROUND OF THE INVENTION

This invention relates to conveying devices. Specifically, this invention relates to an improved conveyor belt drive roller.

Conveyor belt systems for moving goods are well known in the art. The standard conveyor belt system has a conveyor support assembly, a drive roller, a tail roller, and a conveyor belt stretched between the two rollers. The drive roller is attached to a motor or engine system which turns the drive roller. Since the conveyor belt is stretched between the drive roller and the tail roller, the action of the rotating drive roller moves the conveyor belt in a linear fashion between the drive roller and the tail roller. As a result, objects which are placed on the conveyor belt move along the path of the belt from one end to the other.

Traditionally, the drive rollers for these systems were elongated cylindrical devices which rotated about an axis and were connected to a driving force. The surface of the cylinder device was generally smooth and relied upon the friction between the cylinder surface and the conveyor belt which was typically rubber to provide the driving force to drive the belt. Over the years, improvements have been made to increase the driving force of the belt through devices such as knurling the drive roller and forming a belt groove into the drive roller, and attaching a belt, such as a V-belt, to the bottom or inside of the conveyor belt which road in the belt groove and gave greater driving force and reduced axial and linear sliding of the conveyor belt on the drive roller. A further improvement to the conveying system is shown in Patent Application Publication No. US2004/0089519 A1 where a conveyor belt has a plurality of belt teeth or lugs and a plurality of recesses or grooves on the drive roller, therefore the drive roller grooves receive the belt lugs and give an even more positive driving force for the belt.

One of the problems of the prior art is that if a traditional flat drive roller is used, only a traditional flat bottomed conveyor belt can be used on that system. With a belt conveyor system or a belt teeth/lug system is used, then only that belt or a traditional flat conveyor belt can be used with the corresponding drive roller. In other words, a belt conveyor belt cannot be used on a lug-type drive roller and visa versa. This creates a need to keep on hand multiple conveyor belts which mate specifically with the conveyor system's drive pulley.

In view of the foregoing, it is desirable to have a universal conveyor drive roller which will work with any of the aforementioned types of conveyor belts.

The primary objective of the present invention is to provide an improved conveyor belt drive roller.

A further feature of the present invention is a drive roller which is easy to wash down and clean out of by-products that could possibly accumulate on the conveyor belt.

A further objective of the present invention is a conveying system which is capable of using traditional or improved conveyor belts.

A further objective of the current invention is a method of creating a universal drive roller for a conveyor belt system.

A further objective of the current invention is a provision of a conveyor belt drive roller which is economical to manufacture, durable in use, and efficient in operation.

One or more of these or other objects, features or advantages of the invention will be apparent from the specification and claims that follow.

BRIEF SUMMARY OF THE INVENTION

One or more of the foregoing may be achieved by a roller for driving a conveyor belt, comprising a cylindrical body having a circumference and opposite ends, a plurality of lug grooves in the cylinder located around the circumference of the cylinder and a belt slot in the cylinder located around the circumference of the cylinder. The belt slot may be located adjacent the lug grooves and may be deeper than the lug grooves. The lug grooves are preferred to be formed with inverted tapers which deepen toward the belt slot. The belt slot is preferred to receive a V-belt placed on an underneath side of a conveyor belt and the lug grooves are configured to receive lugs which are placed on an underneath side of a conveyor belt.

One or more of the foregoing may also be achieved by a conveyor belt system combination comprising a conveyor support assembly, the conveyor support assembly comprising a drive roller and a follower roller each configured to rotate, a belt stretched around the drive roller and the tail roller, the driver roller operatively connected to a drive motor, and the driver roller configured as a cylindrical body having a circumference and opposite ends, a plurality of lug grooves in the cylinder located around the circumference of the cylinder, and a belt slot in the cylinder located around the circumference of the cylinder.

One or more of the foregoing may also be achieved by a method of creating a universal conveyor belt drive roller comprising the steps of providing a cylindrical body with a circumference, forming a plurality of lug grooves in the cylinder around the circumference of the cylinder and forming a belt slot in the cylinder around the circumference of the cylinder. It is preferred that the belt slot be adjacent the lug grooves and formed with inverted tapers which deepen towards the belt slot.

A few terms need to be explained in this application. The word conveyor belt in this application is considered to mean a continuous-looped belt as is standard in the art. The word lugs is used within this application to describe protrusions extending on the underside of a conveyor belt. The term inverted taper, as used in this application, generally refers to a taper or slight angle of a surface which extends inward with respect to the part it is on.

BRIEF DESCRIPTION OF THE DRAWINGS

FIG. 2 shows an end view of the conveyor belt system assembly of FIG. 1.

FIG. 3 shows a sectional view of the conveyor belt system assembly of FIG. 1 taken along lines 3-3 of FIG. 2.

FIG. 8 shows a top view of the drive roller of FIG. 4.

FIG. 9 shows a side view of the drive roller of FIG. 8.

FIG. 10 shows a sectional view of the drive roller of FIG. 8 taken along lines 10-10.

DETAILED DESCRIPTION OF THE PREFERRED EMBODIMENT

Figure 1:
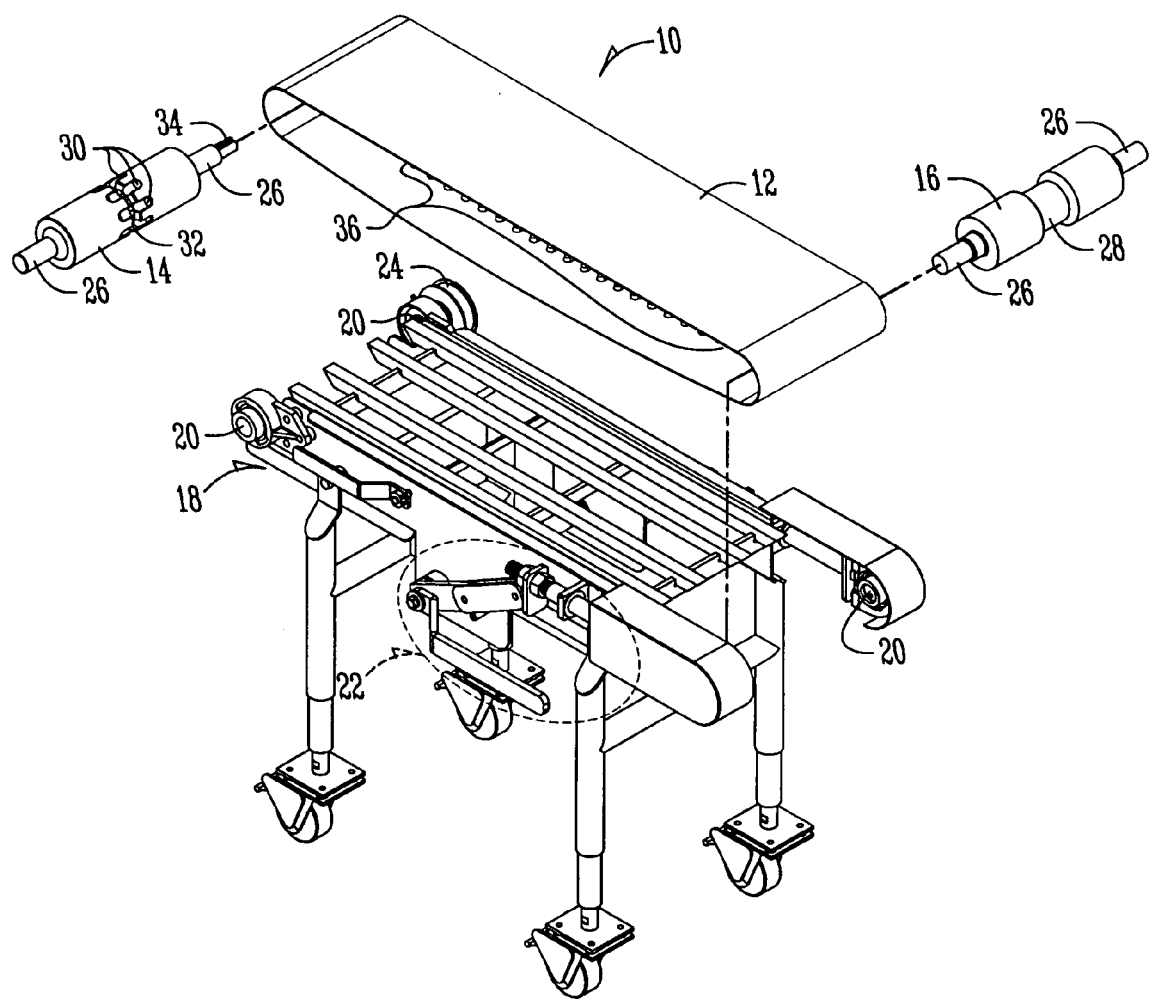
FIG. 1 shows an exploded view of one embodiment of a conveyor system assembly using the drive pulley of the current invention.
Figure 5:
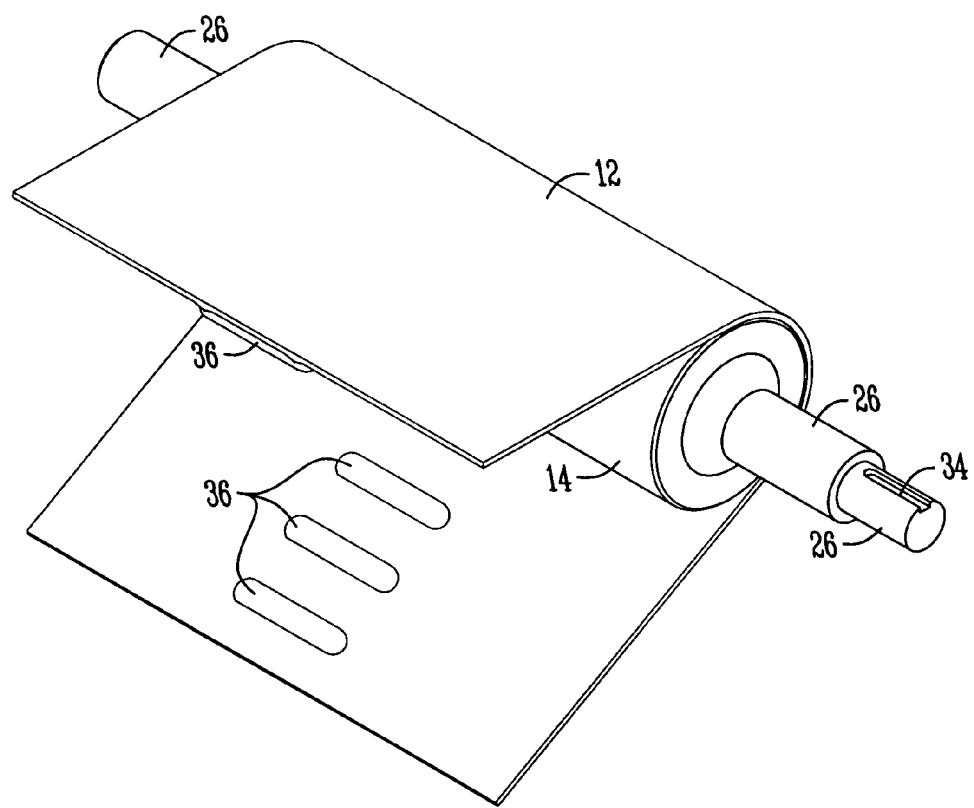
FIG. 5 shows one embodiment of a conveyor belt drive roller of the current invention engaging a conveyor belt.

One embodiment of a belt conveyor system assembly 10 is shown in FIGS. 1-3. The convey system assembly 10 of the current invention can be used for conveying any goods, whether they be commercial goods, industrial goods, food goods, or etc.

The conveyor belt 12 shown in the figures is constructed with belt lugs 36. These lugs 36 give extra driving force for a more positive traction belt 12 and also help to keep the belt 12 centered on the drive roller 14 and the follower roller 16.

The conveyor support assembly 18 shown in FIGS. 1, 2 and 3 can be configured in any form. The conveyor support assembly 18 in this embodiment, is configured with roller bearings 20, which allow both the drive roller 14 and the follower roller 16 to rotate about an axis. The belt tightening assembly 22 is used for keeping tension on the conveyor belt 12 so that the belt does not slip with respect to the drive roller 14. The belt tightening assembly can be affixed to tighten either the drive roller 14, the follower roller 16, an idler roller (not shown), or other similar method of tightening the conveyor belt 12.

This embodiment of the belt conveyor system assembly 10 is shown with a drive roller drive wheel 24 which connects to a roller shaft 26 on the drive roller 14. The drive roller drive wheel 24 is affixed to the roller shaft 26 in such a way that the drive roller drive wheel receives power through a belt drive system connected to a motor (not shown). However, it is contemplated that the drive roller 14 can be connected to any type of device such as, but not limited to, a motor, engine, transmission, belt drive, chain drive, shaft drive, or other system capable of causing the drive roller 14 to rotate. It is also preferred that the drive roller drive wheel 24 be held tight to, and non-rotating with respect to the drive roller 14 via a roller shaft drive groove 34, such as a standard keyway which is commonly used in the art. However, set screws, welds, notches, adhesives, bolts or other means may be used for holding a drive roller drive wheel 24 tight to the drive roller 14 to prevent slippage as the drive roller 14 is being rotated.

As seen in FIGS. 1 and 3, the follower roller 16 is preferred to be constructed as a cylinder with a roller lug slot 28 and two shafts 26. The shafts 26 should rotate freely about an axis with the aid of the roller bearings 20. The follower roller lug slot 28 is preferred to be an indention in the cylinder of the follower roller 16 which goes around the circumference of the follower roller 16. The purpose of the follower roller lug slot 28 is to allow the conveyor system assembly 10 to be used with a standard flat bottom conveyor belt (not shown), a conveyor belt with a belt drive, such as a V-belt affixed to the underneath side of the conveyor belt, or a conveyor belt 12 with belt lugs 36. A standard flat bottom conveyor belt can be used with the follower roller lug slot 28 in any location on the follower roller 16. However, for a belt drive conveyor belt or a conveyor belt with lugs 12 to be used, the belt lugs 36 or the belt should align with the follower roller lug slot 28. This alignment, allows the conveyor belt 12 to travel around the follower roller 16 without the belt lugs 36 or the drive belt (not shown) interfering with the travel or pushing outward on the conveyor belt as the belt travels around the roller 16.

As seen in FIG. 1 and FIGS. 3-10, the drive roller 14 is preferred to be formed with multiple drive roller lug grooves 30 and a drive roller belt slot 32. In addition, it is preferred that the drive roller 14 be configured with a roller shaft 26 extending from each end of the drive roller 14. In addition, a roller shaft drive groove 34 can be used in connection with a drive roller drive wheel 24 and a standard key to prevent slippage during operation of the drive roller 14.

The drive roller lug grooves 30 should be configured to mate with the belt lugs 36. As seen in the preferred embodiment, the belt lugs 36 are an elongated rounded body with rounded ends. Therefore, in the preferred embodiment of the drive roller 14 the drive roller lug grooves 30 are configured to mate with this shape. This gives a positive, slip resistant drive capability for the drive roller 14 with respect the conveyor belt 12. Any desired shape can be used for the belt lugs 36 and the corresponding drive roller lug grooves 30. In fact, the belt lugs 36 and the drive roller lug grooves 30 do not have to be the same shape so long as the belt lugs 36 fit into the drive roller lug grooves 30.

The preferred embodiment of the invention also has a drive roller belt slot 32 formed in the drive roller 14. This belt slot 32 goes around the circumference of the drive roller 14. The purpose of the drive roller belt slot 32 allows the drive roller 14 of the current invention to be used with a standard conveyor belt with a belt, such as a V-belt, incorporated into the bottom side of the conveyor belt. As is standard in the art, belt drive conveying systems help give added traction and force to a drive roller and also help keep the conveyor belt located axially on the drive roller. It is preferred that the drive roller belt slot 32 be configured to mate with a standard V-belt. However, other types of belt slots 32 can be used with the current invention.

It is preferred, but not necessary that the drive roller belt slot 32 be located in connection with the drive roller lug grooves 30 as shown in the figures. However, the drive roller lug grooves 30 and the drive roller belt slot 32 can be located on the drive roller 14 in different locations. In fact, multiple drive roller belt slots 32 and multiple sets of drive roller lug grooves 30 can be used on the same drive roller 14 corresponding to a configuration of the desired belt to be used on the system.

As seen in FIGS. 6-10, the drive roller lug grooves 30 are preferred to have rounded ends 38. These rounded ends 38 allow the drive roller 14 to accurately mate with a conveyor belt with lugs 12. In addition, the rounded ends 38 reduce containments sticking in corners of the drive roller lug grooves 30. Furthermore, the rounded ends 38 allow for easy cleanout of contaminants within the drive roller lug grooves 30.

It is also preferred, but not necessary, that the drive roller lug grooves 30 be constructed with an inverted taper 40 so that the groove 30 follows inward towards the center of the drive roller 14 as it reaches the linear center of the lug groove 30. This allows for easier cleaning of contaminants within the lug grooves 30 because when being wash with high pressure wash, the contaminants are forced away from the high pressure and travel along the taper 40 towards the roller belt slot 32. Once, contaminants are in the belt slot 32 they are easily washed away with high pressure wash.

Additionally, having the inverted taper 40 in the roller lug grooves 32 allows for automatic cleaning of the grooves 30 as the belt lugs 36 travel in and out of the lug grooves 30 during use. This is done by the fact that as the belt lug 36 enters the lug groove 30, it gets pressed into the lug groove 30 and any contaminants in the groove 30 are pushed inward toward the center of the drive roller 14 and therefore migrate towards the belt slot 32. The contaminants which end up in the belt slot 32 are more likely to fall out of the belt slot 32. Thus, self cleaning of the lug grooves 30 is accomplished.

With the drive roller 14 being constructed with drive roller lug grooves 30 and a drive roller belt slot 32, a single drive roller 14 can be used with conventional flat-bottom conveyor belts, belt drive or V-belt drive conveyor belts, and lug-drive conveyor belts 12. Therefore, it is not necessary to continually stock every type of conveyor belt for use on a conveyor system assembly. In other words, if a belt fails, whatever belt is available will work with the current drive roller 14.

The drive roller 14 and the follower roller 16 are preferred to be made from stainless steel or other material suitable of withstanding the forces upon them. The shape, grooves, slots, etc. of the drive roller 14 and the follower roller 16 can be milled, molded, or otherwise formed by any suitable method.

Figure 4:
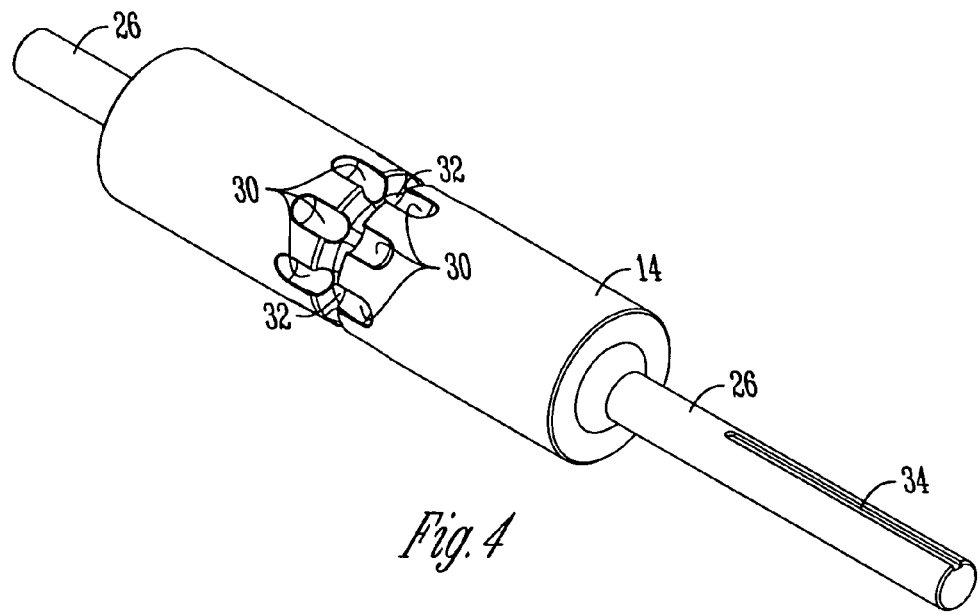
FIG. 4 shows one embodiment of a conveyor belt drive roller of the current invention.
Figure 4A:
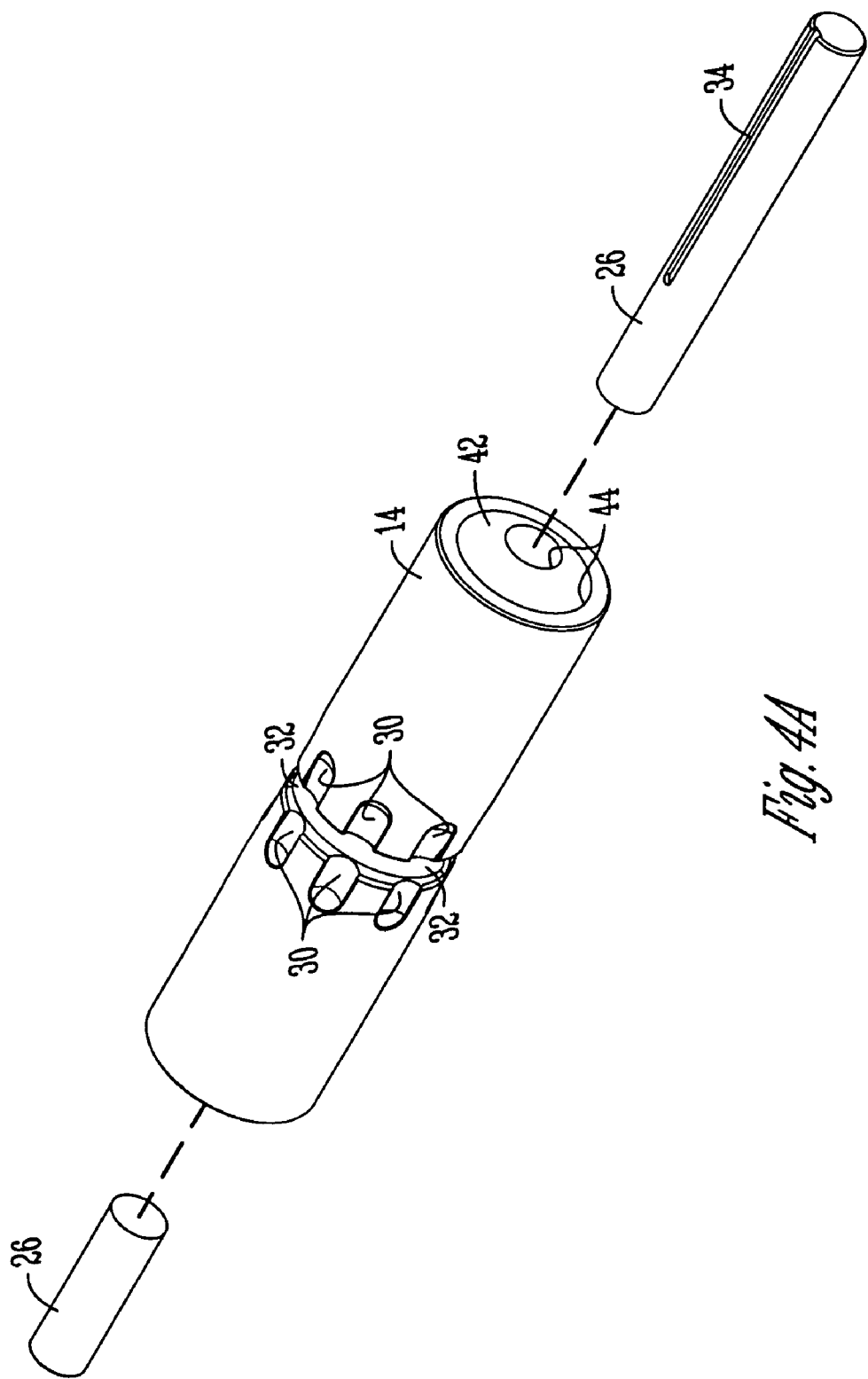
Figure 6:
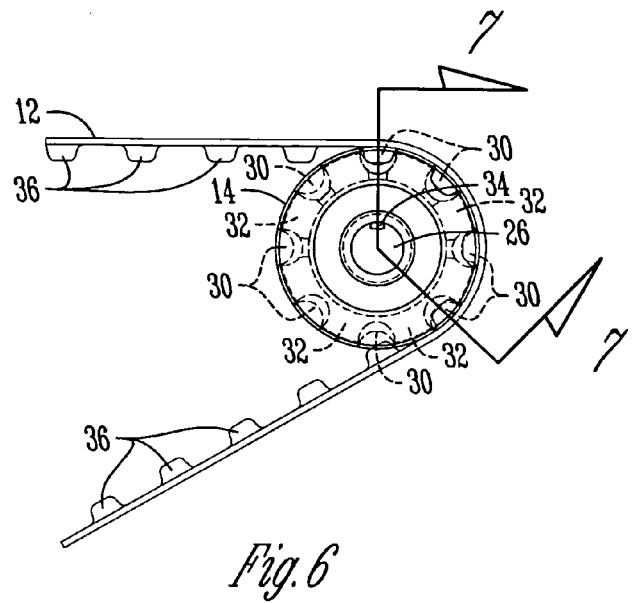
FIG. 6 shows an end view of the conveyor belt drive roller engaging a conveyor belt shown in FIG. 5.
Figure 7:
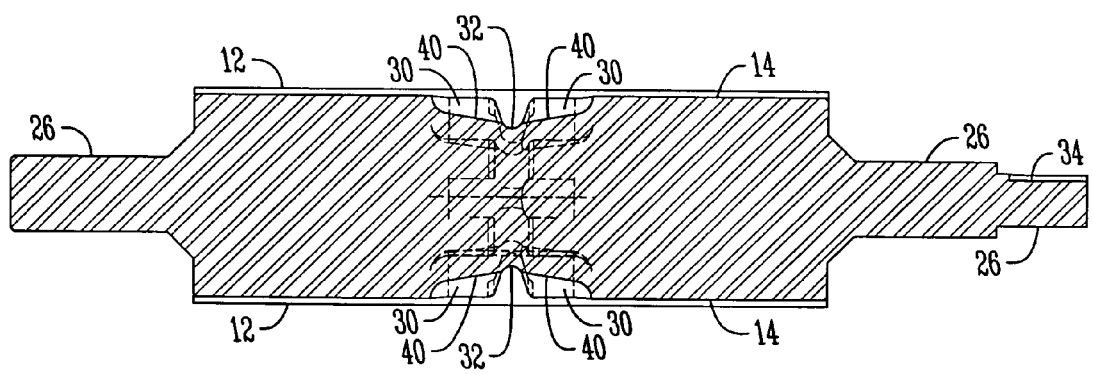
FIG. 7 shows a sectional view of the drive roller engaging a conveyor belt of FIG. 5 taken along lines 7-7 of FIG. 6.

As shown in FIG. 4A, the drive roller 14 can be constructed from a hollow tube or pipe. Roller end caps 42 can hold the roller shaft 26 to the roller 14 with one or more weld joints 44. This design allows a roller 14 to be constructed less constly than from a solid material. In addition, the end caps 42 and weld joints 44 can add strength to the roller 14.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A roller for driving a conveyor belt comprising:
   a hollow cylindrical body;
   the body having a circumference, a center axis, an outer surface and opposite ends;
   a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a concave rounded bottom; and
   a slot in the cylinder in communication with and transverse to the lug grooves, the slot defined as a cutout in the cylinder running perpendicular to the axis of the body which extends from the outer surface into the body around the circumference of the body.

2. The roller of claim 1 wherein the slot is located adjacent the lug grooves.

3. The roller of claim 2 wherein the slot is deeper in the body than the lug grooves.

4. The roller of claim 3 wherein the lug grooves are formed with inverted tapers which deepen towards the slot.

5. The roller of claim 1 wherein the slot is continuous around the circumference of the body and configured to receive a v-belt.

6. The roller of claim 1 wherein the lug grooves are configured to receive lugs which are placed on an underneath side of a conveyor belt.

7. The roller of claim 1 further comprising a shaft welded to the body and extending from the body at each end.

8. A conveyor belt system combination comprising:
   a conveyor support assembly;
   the conveyor support assembly comprising a drive roller and tail roller configured to rotate;
   a belt stretched around the drive roller and the tail roller;
   the drive roller operatively connected to a drive motor; and
   the drive roller configured as a hollow cylindrical body;
   the body having a circumference, a center axis, an outer surface and opposite ends;
   a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a concave rounded bottom; and
   a slot in the cylinder in communication with and transverse to the lug grooves, the slot defined as a cutout in the cylinder running perpendicular to the axis of the body which extends from the outer surface into the body around the circumference of the body.

9. The conveyor belt system of claim 8 wherein the slot is located adjacent the lug grooves.

10. The conveyor belt system of claim 8 wherein the slot is deeper than the lug grooves.

11. The conveyor belt system of claim 10 wherein the lug grooves are formed with inverted tapers which deepen towards the slot.

12. The conveyor belt system of claim 8 wherein the slot is configured to receive a v-belt.

13. The conveyor belt system of claim 8 wherein the lug grooves are configured to receive lugs which are placed on an underneath side of a conveyor belt.

14. The conveyor belt system of claim 8 further comprising a shaft welded to the body and extending from the body at each end.

15. A roller for driving a conveyor belt comprising:
    a hollow cylindrical body;
    the body having a circumference, a center axis, an outer surface and opposite ends;
    a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a rounded bottom;
    a slot in the cylinder in communication with and transverse to the lug grooves, the slot defined as a cutout in the cylinder running perpendicular to the axis of the body which extends from the outer surface into the body continuously around the circumference of the body to receive a belt, the slot being deeper in the body than the lug grooves: and
    the lug grooves formed with inverted tapers which deepen towards the slot.

16. A conveyor belt system combination comprising:
    a conveyor support assembly;
    the conveyor support assembly comprising a drive roller and tail roller configured to rotate;
    a belt stretched around the drive roller and the tail roller;
    the drive roller operatively connected to a drive motor; and
    the drive roller configured as a hollow cylindrical body;
    the body having a circumference, a center axis, an outer surface and opposite ends;
    a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a rounded bottom;

a slot in the cylinder in communication with and transverse to the lug grooves, the slot defined as a cutout in the cylinder running perpendicular to the axis of the body which extends from the outer surface into the body continuously around the circumference of the body to receive a belt, the slot being deeper in the body than the lug grooves: and the lug grooves formed with inverted tapers which deepen towards the slot.

17. A roller for driving a conveyor belt comprising:

a hollow cylindrical body;

the body having a circumference, a center axis, an outer surface and opposite ends;

a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a rounded bottom, the rounded bottom formed with inverted tapers which deepen inward from the ends of the groove; and a slot in the cylinder in communication with and transverse to the lug grooves, the slot defined as a cutout in the cylinder running perpendicular to the axis of the body which extends from the outer surface into the body around the circumference of the body.

18. A roller for driving a conveyor belt comprising:

a hollow cylindrical body;

the body having a circumference, a center axis, an outer surface and opposite ends;

a plurality of elongated lug grooves in the cylinder spaced apart around the circumference of the cylinder, the lug grooves formed parallel to the longitudinal axis of the body and defined as a cutout in the body which extends from the outer surface into the body, each of the grooves further formed with rounded ends and a concave rounded bottom, the rounded bottom formed with inverted tapers which deepen inward from the ends of the groove.

* * * * *